June 30, 1925. 1,544,443
E. U. GIBBS
THRUST BEARING
Filed May 6, 1924      2 Sheets-Sheet 2
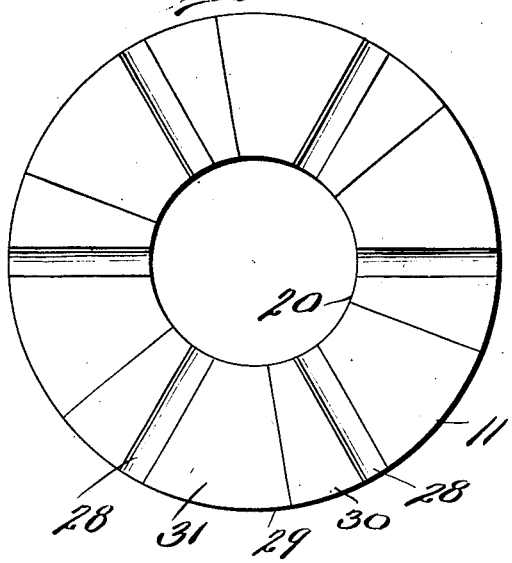
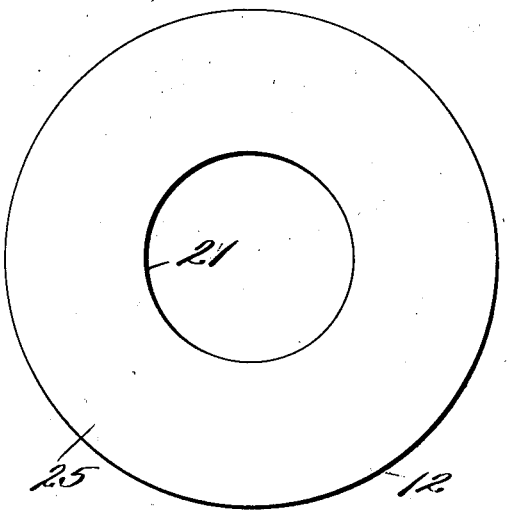
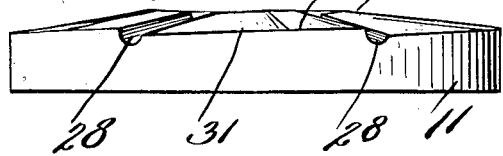
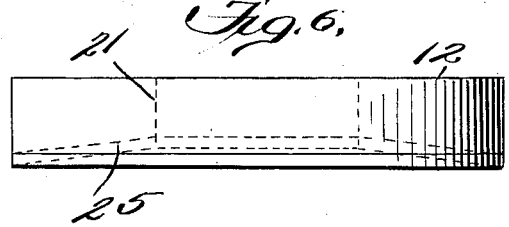
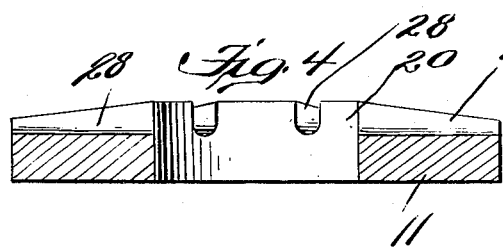
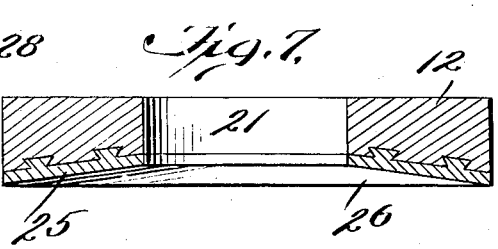
Inventor
Eugene U. Gibbs
By
Attorney Patented June 30, 1925.

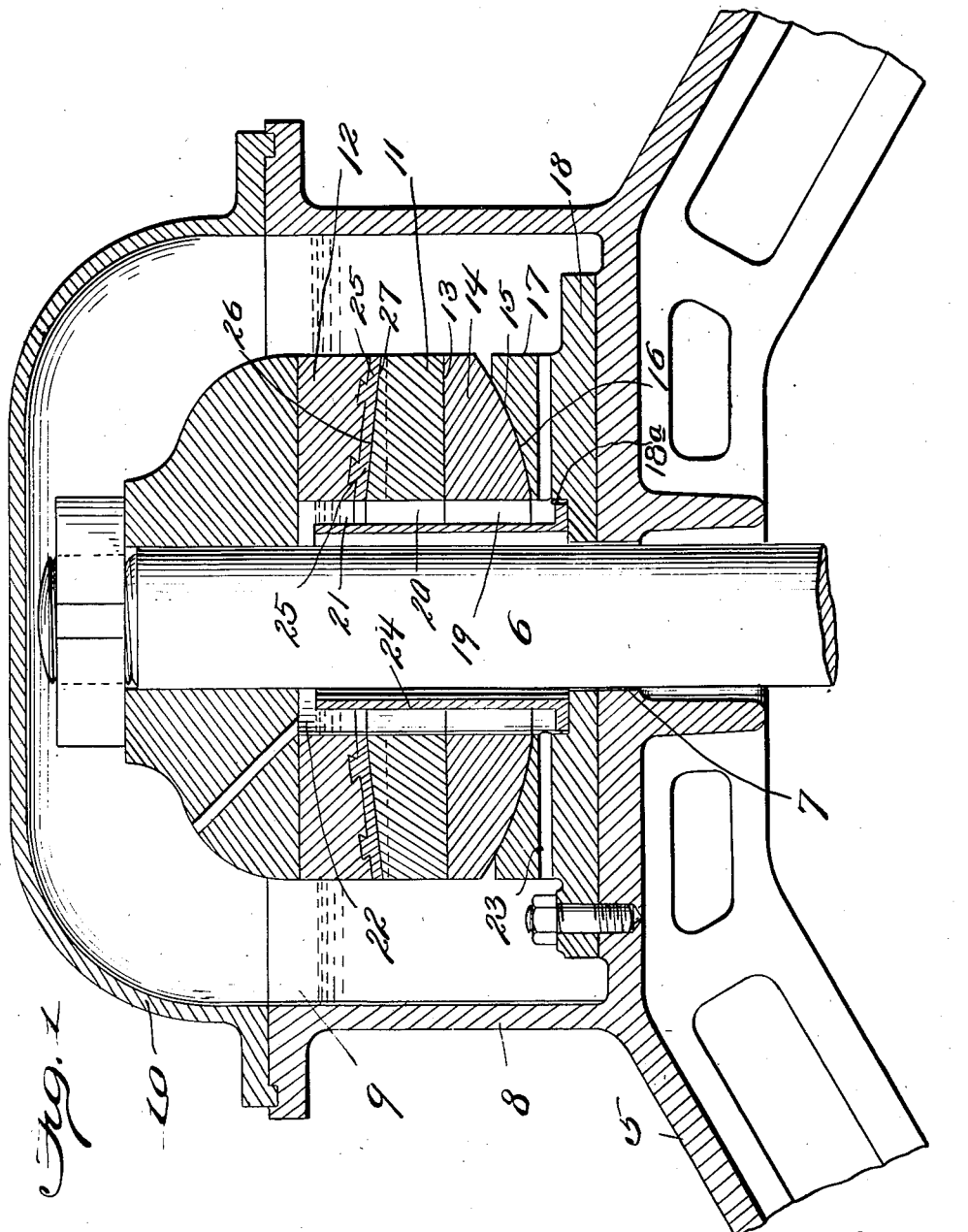

1,544,443

UNITED STATES PATENT OFFICE.

EUGENE U. GIBBS, OF YORK, PENNSYLVANIA.

THRUST BEARING.

Application filed May 6, 1924. Serial No. 711,441.

*To all whom it may concern:*

Be it known that I, EUGENE U. GIBBS, a citizen of the United States residing at York, in the county of York and State of Pennsylvania, have invented new and useful Improvements in Thrust Bearings, of which the following is a specification.

This invention relates to thrust bearings for turbine or other shafts embodying a specific lubricating structure whereby a more economical and efficient lubrication ensues, with material advantages in the operation or rotation of the turbine shaft and the general operation of a turbine and other mechanism associated therewith. The present invention is an improvement of the structure disclosed by my Patent No. 1,153,777, dated September 14, 1915. The principle involved in the operation of the bearing in the present improvement is practically the same as that of the bearing disclosed by my patent, namely, a wedging action between parts of the bearing and the utilization of a film of lubricating oil between the bearing parts to eliminate the disadvantages incident to unrestricted thrust.

In all oil film thrust bearings, as far as known, a guide or steady bearing for the shafts must be used, but in the present bearing improvement the guide bearing is eliminated and the thrust bearing itself overcomes the side pull, which is due to belts or other driving mechanisms associated with the shaft. In the present construction of the parts of the bearing the side pull on the shaft is obviated by making interacting parts of the bearing with thrust faces either conical or spherical, the conical contour being preferred as it requires less machine work.

The essential elements in the present bearing consist of a stationary disk and a rotating disk, the stationary disk having inclined faces which allow the oil to be drawn or fed in between the said disk and the rotary or revolving disk, to build up a thrust pressure between the two disks equal to the total load on the bearing. The adhesion of the oil to the revolving disk causes a pressure, due to the inclined or wedge surfaces of the stationary disk, to be set up and the oil is drawn or fed regularly between the two disks in an effective film-like form.

The invention consists in the preferred construction and arrangement of the several parts which will be more fully hereinafter described and claimed, reference being had to the accompanying drawings, which show one application of the present invention for the purpose of demonstrating the practicability of the improvement.

In the drawings:

Fig. 1 is a sectional elevation of a portion of turbine mechanism showing the upper bearing for the turbine shaft and sufficient of the general turbine structure to illustrate the practicability of the application of the features of the improvement;

Figs. 2, 3 and 4 are, respectively, a top plan view, an edge elevation, and a transverse vertical section of the stator ring;

Figs. 5, 6 and 7 are, respectively, a bottom plan, an edge elevation, and a transverse vertical section of the rotor ring.

The improved bearing has been illustrated as applied to a turbine shaft simply for convenience in demonstrating one of its advantageous applications, but it will be understood that the improved bearing may be used with any shaft having the same thrust contingencies that affect a turbine shaft.

The numeral 5 designates a turbine casing or dome which will be constructed as usual, with the exception of the elimination of a guide or steady bearing, the shaft 6 in the present instance extending through an opening 7 at the center of the casing or dome without any particular bearing structure at this point. The casing 5 is provided with an upwardly projecting cylindrical extension or auxiliary casing 8, to form an oil chamber 9 having mounted thereover a cap 10 suitably secured to the upper rim of the auxiliary casing 8. It will be seen that the casing 8 and cap 10 enclose the upper end of the shaft 6 and the improved bearing. The bearing proper comprises a stationary disk or stator 11 and a rotor or revolving disk 12, the stator disk or ring 11 being mounted on the upper flat face 13 of a leveling ring 14. The leveling ring 14 has a lower spherical face 15 engaging a corresponding concave seat 16 formed in the upper portion of a boss 17 rising from a bottom member 18 which is secured to the top of the dome 5 concentrically within the auxiliary casing 8. The construction and arrangement of the leveling ring 14 and boss 17 with the interacting spherical surfaces sets up a wedging action and ensures a positive placement and mounting of the ring or disk 11 relatively to the rotor or revolving disk 12 disposed over the said disk 11 as explained, and moreover, this structure provides for an accurate disposition of the ring or disk 11 by a simple operation when the parts of the bearing are assembled. The boss 17 is formed with a circular recess 18ª of materially greater diameter than the diameter of the shaft 6, and the leveling ring 14 and stator and rotor rings or disks 11 and 12, respectively, have central openings 19, 20 and 21 of the same diameter as the said recess 18ª, and by this means an inner oil chamber 22 is formed through which the shaft concentrically extends. Communication between the outer supply oil chamber 9 and the inner oil chamber 22 is provided by ports or ducts 23 extending through the boss 17, and by this means a thorough circulation of the oil between the two chambers may at all times ensue. Within the inner oil chamber 22 and concentrically held therein is a fixed guard sleeve 24 which is of greater internal diameter than the diameter of the shaft 6, the shaft 6 occupying at all times a concentric relation to the said guard sleeve. This guard sleeve prevents the oil from coming directly into contact with the shaft, and leakage and waste of the oil is thereby obviated.

The rotor ring or disk 12 has a babbitted wearing face 25 applied thereto, as clearly shown by Fig. 7, and concaved or recessed, as at 26, to fit over and snugly engage the conical bearing face 27 of the stator ring or disk 11. As hereinbefore specified, it is preferred that the bearing face 27 of the stator ring or disk 11 be constructed of conical contour, and this contour is uniformly carried out throughout the whole area of this face. The conical contour of the bearing face 27 of the ring or disk 11 is more economical from a standpoint of construction than a spherical face, in view of the fact that less machine work is required to complete the ring or disk for practical purposes. The bearing face 27 of the ring or disk 11 is formed with radial grooves or channels 28, which extend fully from the central opening 20 outwardly through the periphery of the said ring or disk and have a variable depth throughout their lengths. Between the grooves 28 segmental portions or sections 29 are produced, and each segmental portion or section is formed with an upper segmental flat comparatively narrow bearing face part 30 and a laterally inclined segmental bearing face part 31, the one side terminal of the bearing face part 31 intersecting the side wall of the adjacent groove 28 at a point materially below the level of the opposite corresponding terminal side of the flat bearing face part 30, the latter intersecting the side wall of the adjacent groove 28 at the highest part of the latter or at its upper terminal. This construction of each segmental portion or section is regularly continued throughout the whole bearing face 27. The segmental or flat bearing face parts 30 of the segmental portions or sections 27 render the thrust obstruction by the bearing effective by providing resisting surfaces that will not be rapidly worn, especially in view of the lubricating material or oil that works thereover, and the friction surfaces are reduced to a minimum, in view of the fact that the said segmental parts 30 of the portions or sections 29 have direct contact or engagement with the babbitted wearing face 25 carried by and uniformly movable with the upper ring or disk 12. It is obvious that by forming the segmental bearing parts 30 of comparatively narrow width, the aggregate surface composed of the combined bearing parts 30 throughout the full area of the conical bearing face 27 of the ring or disk 11 will materially reduce the coordinated surfaces in contact, yet provide for a sufficient stability of support or interacting engagement of the operating faces of the stator ring or disk 11 and the rotor ring or disk 12.

The chamber 9 will be first supplied with a quantity of oil and filled to about the level noted in Fig. 1, access to this chamber being obtained by removing the cap 10 or by the use of any other well known oil feeding means. From the chamber 9 the oil will feed through the ports or ducts 23 into the inner oil chamber 22 and be supplied to the bearing faces of the rings or disks 11 and 12 at inner and outer portions of the latter. The oil will also circulate through the grooves or channels 28 between the two chambers and be caused to be drawn over the inclined bearing parts 31 of the portions or sections 29 towards the segmental flat bearing parts 30 in film-like form by being taken up from the grooves or channels 28, and by this means a pressure is built up between the two rings or disks equal to the load on the bearing and the oil adheres to the revolving disk and effects a pressure due to the inclined or wedge surfaces or inclined bearing parts 31. The oil which passes into the inner or circulating chamber 22 may flow outwardly to the supply chamber 9 through the ports or ducts 23, as hereinbefore noted, or the oil from the chamber 9 may circulate from the latter back and forth relatively to the chamber 28, or vice versa, and as the guard 24 extends high enough above the level of the oil in the chamber 9 to prevent overflow, there will be no waste of oil due to leakage or contact thereof with the portion of the shaft 6 passing through the inner chamber 22. The variable depth of the grooves or channels 28 is very essential to an equal feeding of the oil from the said grooves or channels to the inclined surfaces or bearing parts 31 between the grooves or channels, the outermost portions of the said bearing parts having the same volume of oil applied thereto by reason of the fact that the grooves or channels are of variable depth throughout their radial extent, and hence the film of oil drawn over each inclined bearing part of the face 27 of the disk 11 will be of the same thickness at the outer periphery as at the inner periphery of the ring or disk. This uniformity of the feed of oil through the medium of the specified depth of the grooves or channels 28 prevents any tendency of the outer portions of the ring or disk being supplied with a less quantity of oil than the inner or intermediate portions of the ring or disk, and at the same time a full and regular circulation of the oil backwardly and forwardly between the chambers 9 and 22 will ensue. A continual displacement of different portions of the oil by a thorough circulation of the oil as set up between the chambers 9 and 22 through the ports or ducts 23 and the radial grooves 28, will bring new quantities of oil into contact with and between the interacting faces of the rings or disks 11 and 12, and this circulation and displacement of different portions of the oil will be due entirely to the variable depth of the radial grooves or channels 28. There will be no choke or occlusion of the oil in its circulation through the grooves or channels 28 and the ports or ducts 23, and as a consequence, material opposition will exist to wear on the parts of the bearing in view of the constant preservation of a uniform oil film pressure equal to the load on the bearing.

In assembling the stator and rotor rings or disks 11 and 12 with relation to the leveling ring 14, the latter will be adjusted in the first instance to produce an accurate engagement of the opposing bearing faces of the said stator and rotor rings or disks and such adjustment will be fixed, and at any time subsequent to a primal adjustment the said leveling ring may be further adjusted to reset the stator and rotor rings or disks as may be found necessary.

From the foregoing it will be understood that the essential feature of the invention consists in raising the bearing face of the stator ring and correspondingly recessing the bearing face of the rotor ring or disk for accuracy in registration of the bearing faces of the two rings or disks, and in addition, to provide the radial grooves or channels 28 and the segmental sections between the latter, each having a horizontally flat bearing part of comparatively narrow width and a much wider inclined bearing part. The angle of the complete bearing face of the stator ring or disk 11 as well as the angle of the inclined bearing parts 31 may be modified at will, and it will be understood that if the angle of the complete bearing face 27 be modified, the recessed or bearing face 26 of the rotor ring or disk 12 will be likewise modified, so as to always ensure a snug fitting and forming of the film of oil in relation to each bearing part 31 and 30.

The improved bearing has been shown applied to a vertically disposed shaft, but it can be equally well used with a horizontal shaft or a shaft in any other position between a horizontal and vertical plane.

The bearing parts 30, though having flat surfaces as contradistinguished from the laterally inclined bearing parts 31, incline inwardly towards the center opening 20 regularly in accordance with the general conical contour of the complete bearing face 27 of the stator ring or disk 11. The bearing parts 31, likewise, have the same trend toward the opening 20 of the ring 11, and consequently each bearing part 31 is inclined in two directions.

What is claimed as new is:

1. In a thrust bearing, the combination of an oil chamber, a shaft extending thereinto, a rotor ring secured to the shaft, a stator ring cooperating with the rotor ring, the rings being located in the oil chamber and having projecting and recessed interacting bearing faces of the same general contour, the projecting bearing face of the one ring being generally of conical contour and radially divided by oil grooves of variable depth throughout their lengths to provide segmental sections each comprising a laterally inclined bearing part with a flat surface and a narrower segmental flat part for circulation of oil and formation of oil films relatively to the said interacting bearing faces of the two rings.

2. In a thrust bearing of the class specified, the combination with an oil chamber and a shaft extending thereinto, of a rotor ring secured to the shaft, and a stator ring cooperating with the rotor ring, the rings having projecting and recessed interacting bearing faces of the same general contour, and the bearing face of the stator ring being generally of conical contour with the highest portion thereof at the center, said bearing face being radially divided by oil grooves extending fully from the central portion through the periphery thereof and of variable depth throughout their lengths to provide segmental sections each comprising a laterally inclined part with a flat surface and a segmental flat part for circulation of oil and formation of oil films relatively to the interacting bearing faces of the two rings, 3. In a thrust bearing of the class specified, the combination with an oil chamber and a shaft extending thereinto, of a rotor ring secured to the shaft, and a stator ring cooperating with the rotor ring, the rings respectively having projecting and recessed interfitting bearing faces of the same general contour, the bearing face of the stator ring being generally of conical contour sloping towards the periphery thereof, said bearing face being also radially divided by oil grooves of variable depth throughout their lengths and with laterally inclined bearing parts extending partway between each of two oil grooves.

4. In a thrust bearing of the class specified, the combination with an oil chamber and a shaft extending thereinto, of a rotor ring secured to the shaft, and a stator ring cooperating with the rotor ring, the stator ring having a bearing face of general conical contour with the highest portion thereof at the center and the rotor ring having a correspondingly shaped recess to provide relatively interfitting bearing faces of the same general contour and the projecting bearing face of the one ring radially divided by oil grooves of variable depth throughout their lengths and also with laterally inclined bearing parts which also have an outwardly projecting trend towards the center of the said ring between each two grooves, the remaining parts of the projecting bearing face of the one ring being flat and narrower than the laterally inclined bearing parts and also having an outwardly projecting trend towards the center of the ring.

5. In a thrust bearing of the class specified, the combination with an oil chamber and a shaft extending thereinto, of a rotor ring secured to the shaft, and a stator ring cooperating with the rotor ring, the rotor ring being formed with a recessed bearing surface and the stator ring with a projecting conically shaped bearing surface to fit in and operatively engage the recessed bearing face of the rotor ring, the stator ring also being radially divided into segmental sections by oil grooves of variable depth throughout their lengths extending fully from the periphery to the center of the said stator ring, each segmental section comprising a laterally inclined bearing part and a flat segmental bearing part narrower than the laterally inclined bearing part, both of the latter bearing parts having the greater outward projection at the center of the stator ring and following the general contour of the conical bearing face of the stator ring.

6. In a thrust bearing of the class specified, the combination with an oil chamber having a shaft extending thereinto, a rotor ring secured to the shaft, a stator ring cooperating with the rotor ring, the rings being located in the oil chamber and having openings at the centers thereof through which the shaft also extends to provide an inner oil chamber, the rings also having a projecting conical bearing face and a recessed bearing face of the same contour as the projecting bearing face, the projecting bearing face of the one ring being radially divided by oil grooves of variable depth throughout their lengths and which extend from the periphery to the center opening of the ring to provide segmental sections each comprising a laterally inclined part and a segmental narrower flat part for circulation of oil and formation of oil films relatively to the interacting bearing faces of the two rings.

7. In a thrust bearing of the class specified, the combination with an oil chamber and a shaft extending thereinto, a rotor ring secured to the shaft, a stator ring cooperating with the rotor ring, a leveling ring engaging the stator ring, the rotor and stator rings being located in the oil chamber and all of the rings having enlarged central openings to provide an inner oil chamber around the shaft, the rotor and stator rings also having projecting conical and recessed relatively interacting bearing faces, the projecting bearing face of the one ring being radially divided by oil grooves of variable depths throughout their lengths and which extend from the periphery to the central opening of the ring to provide segmental sections each comprising a laterally inclined part and a segmental flat part for circulation of oil and the formation of oil films relatively to the interacting bearing faces of the rotor and stator rings.

In testimony whereof I have hereunto set my hand.

EUGENE U. GIBBS.